April 7, 1964   A. HASBROUCK ETAL   3,127,738
GAS BLEED FROM ROCKET CHAMBER
Filed May 26, 1961
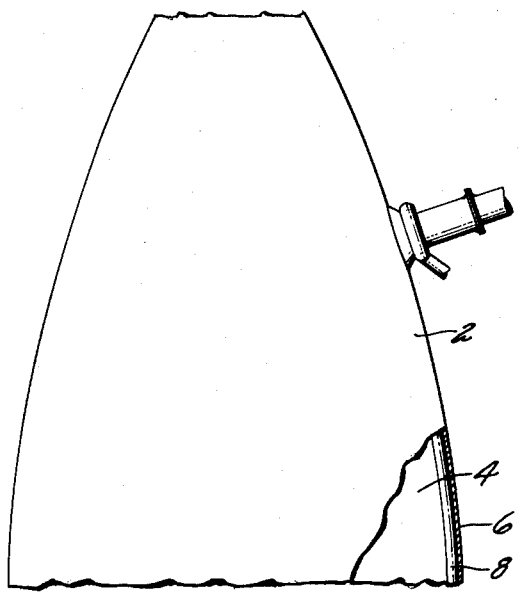
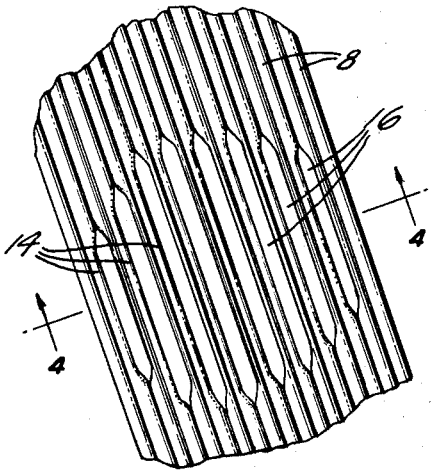
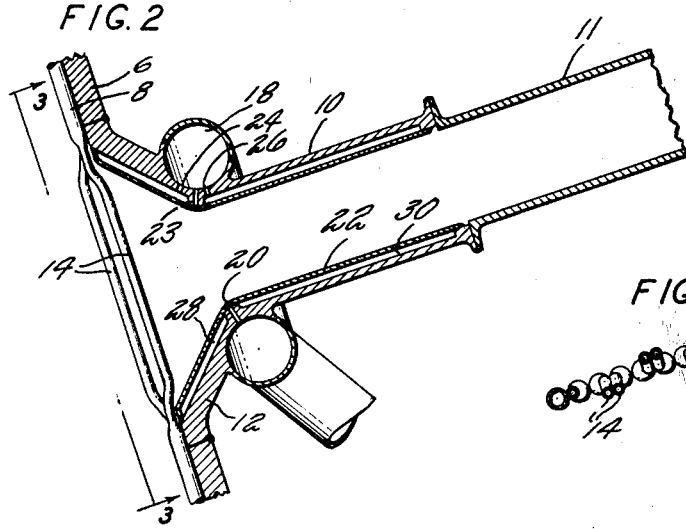
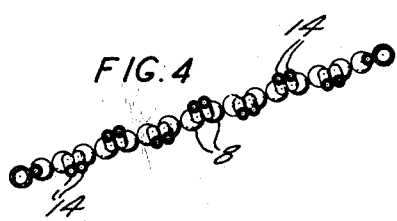
INVENTORS
AUGUSTUS HASBROUCK
LEANDER H. LIPPINCOTT
BY Charles A. Warren
ATTORNEY United States Patent Office 3,127,738
Patented Apr. 7, 1964

3,127,738
GAS BLEED FROM ROCKET CHAMBER
Augustus Hasbrouck and Leander H. Lippincott, Middletown, Conn., assignors to United Aircraft Corporation, East Hartford, Conn., a corporation of Delaware
Filed May 26, 1961, Ser. No. 112,870
3 Claims. (Cl. 60—35.6)

This invention relates to an arrangement for bleeding gas under pressure from the chamber of a rocket to provide hot gas under pressure for other use such as for driving the turbopump for the propellant. This invention is in certain respects an improvement over the subject matter of the copending application of Lippincott and Nelson Serial No. 112,830, filed May 26, 1961.

One feature of the invention is an arrangement by which to provide for bleeding a portion of the hot gas from the rocket chamber with a small amount of modification in the chamber wall. Another feature is an arrangement for shielding the ducting through which the gas is bled.

In the above-identified copending application Serial No. 112,830 the cooling tubes which line the wall of the rocket chamber were necked-down at selected locations to provide for a passage of the hot gas therebetween. The present invention provides for the necking down of a minimum number of coolant tubes so that the cooling effect of the fluid which these tubes will not be detrimentally affected. Another feature of the invention is the use of a cooling fluid which is mixed with the gas being bled for cooling the space between the duct wall and the shield so that the duct wall is protected from excessive temperatures.

Other features and advantages will be apparent from the specification and claims, and from the accompanying drawing which illustrates an embodiment of the invention.

FIG. 1 is an elevation view through a rocket chamber showing the duct arrangement.

FIG. 2 is a fragmentary enlarged sectional view through the wall of the chamber and the duct.

FIG. 3 is an elevation view substantially along the line 3—3 of FIG. 2.

FIG. 4 is a sectional view substantially along the line 4—4 of FIG. 3.

The invention is shown in connection with the wall 2 of a conventional rocket chamber 4 in which event the chamber 4 would be a combustion chamber. The chamber 4 may be a chamber used with a nuclear rocket in which no combustion takes place although the gas within the chamber 4 is extremely hot.

The chamber wall includes an outer shell 6 which constitutes a load-bearing shell. The shell 6 is lined by a plurality of substantially parallel tubes 8 which are arranged in side-by-side contact with one another and in the arrangement shown extend axially of the chamber. These tubes are attached to the shield 6 by brazing or welding and a coolant is circulated through these tubes when the rocket is in operation to prevent overheating of the tubes and to keep the walls 6 at a temperature which will maintain adequate strength in the shell to withstand the pressures within the chamber.

In accordance with the invention, gas from within the chamber is vented to a hot gas duct 10 which is attached to the chamber wall 6 by a frusto-conical duct element 12. The duct 10 is connected to an extension 11 that conducts the hot gas from the chamber to a point of use. To permit escape of hot gas from the rocket chamber into the duct, adjacent tubes 8 are necked-down as at 14 over a substantially circular area coinciding with the end dimension of the duct element 12 and adjacent necked-down portions 14 are brought into contact with one another so that the necked-down portions are arranged in pairs, as best shown in FIGS. 3 and 4. By this arrangement elongated slots 16 are defined between adjacent pairs of tubes thereby providing relatively large flow areas for the hot gas over the tubes and into the duct.

To further increase the flow area, adjacent pairs of the necked-down portions of the tubes are offset in a radial direction as shown in FIGS. 2 and 4, thereby effectively widening the slots 16 and permitting a greater flow over the tubes and into the duct.

The gas passing through the slots 16 will in many cases be at such a high temperature that the material of the duct element 12 and duct 10 could not withstand the pressure and temperature to which they would be subjected. Accordingly, the temperature of the hot gas entering duct 10 is reduced by injecting into the gas as it flows from the duct portion 12 into the duct 10 cold gas from a ring manifold 18 which surrounds the duct 10. Cold gas is discharged through a ring of passages 20 into the hot gas as it enters the duct 10.

To further protect the duct element 12 and duct 10, a liner 22 is positioned within and spaced from the duct element and the duct. This lining or shield is frusto-conical at its entry end to conform to the duct element 12 and then becomes cylindrical to fit with the duct 10, as shown. Obviously, the passages 20 extend through the shield in order that the cold gas may enter the duct and the duct 10 may have an internal rib 23 at this point for these passages. Additional small passages 24 and 26 through the duct element 12 and duct 10, respectively, permit a flow of cold gas from the manifold 18 into the space 28 and defined between the shield and the duct element 12 into the space 30 between the shield and the duct 10, respectively. The liner or shield 22 is porous thereby permitting a flow of the cooling gas through this wall to provide transpiration cooling of the shield as the gas flows through it. Obviously, the gas pressure in the manifold 18 is of necessity higher than the gas pressure in the duct 10.

It may be further noted that, by placing the cooling tubes in pairs in the area through which the hot gas flows, the heat transfer to these tubes is reduced since the hot gas flows only over one side of each tube so that excessive heating of the tubes in this area is avoided. Further, in the event that the necking down of these tubes results in changing the rate of flow through these tubes, it will be possible to put appropriate restrictions in the unrestricted tubes so that the flow in all of the tubes during normal operation of the device will be substantially the same.

It is to be understood that the invention is not limited to the specific embodiment herein illustrated and described, but may be used in other ways without departure from its spirit as defined by the following claims.

We claim:

1. A rocket bleed construction including a rocket wall having a plurality of substantially parallel tubes in side-by-side contact forming at least a part of the wall, certain of said tubes being reduced in diameter over a substantially circular area of the wall to define openings between the tubes, and a duct attached externally to the rocket wall around the circular area into which hot gas from the rocket is discharged in which said reduced diameter tubes are formed in pairs to define said opening and in which the tubes in each of said pairs are in contact to prevent hot gas passage therethrough and hence hot gas heat to transfer thereto.

2. A rocket bleed construction including a rocket wall having a plurality of substantially parallel tubes in side-by-side contact forming at least a part of the wall, certain of said tubes being reduced in diameter over a substantially circular area of the wall to define openings between the tubes, and a duct attached externally to the rocket wall around the circular area into which hot gas from the rocket is discharged, wherein said circular area of reduced diameter tubes comprises reduced diameter sections of adjacent tubes in abutting relation and with alternate sets of adjacent abutting tubes spaced out of alignment with respect to said wall to accentuate the size of bleed openings between tubes, in which a cold manifold surrounds said duct and communicates with openings through said duct for the discharge of cold fluid into the gas in said duct, and in which the duct has a lining within and spaced from the wall thereof, the duct having passages from the cold manifold to the space between the lining and wall for the discharge of a coolant from the cold manifold into said space, and further in which the duct has a lining of porous material and in which coolant is circulated through the porous lining for transpiration cooling of the lining.

3. A rocket bleed construction including, a rocket wall having a plurality of substantially parallel tubes in side-by-side contact forming at least a part of the wall, certain of said tubes being reduced in diameter over a substantially circular area of the wall to define openings between the tubes, and a duct attached externally to the rocket wall around the circular area into which hot gas from the rocket is discharged, wherein said circular area of reduced diameter tubes comprises reduced diameter sections of adjacent tubes in abutting relation and with alternate sets of adjacent abutting tubes spaced out of alignment with respect to said wall to accentuate the size of bleed openings between tubes.

References Cited in the file of this patent

UNITED STATES PATENTS

| | | |
|---|---|---|
| 2,242,491 | Van Brunt et al. | May 20, 1941 |
| 2,523,010 | Goddard | Sept. 19, 1950 |
| 2,585,626 | Chilton | Feb. 12, 1952 |
| 2,841,213 | De Piolenc et al. | July 1, 1958 |
| 3,004,386 | Ledwith | Oct. 17, 1961 |

FOREIGN PATENTS

| | | |
|---|---|---|
| 1,238,816 | France | July 11, 1960 |